United States Patent [19]

Lutz

[11] 3,962,914
[45] June 15, 1976

[54] MOTOR VEHICLE BRAKE TEST APPARATUS AND METHOD

[75] Inventor: Hans Lutz, Ebersbach, Germany
[73] Assignee: Robert Bosch G.m.b.H., Stuttgart, Germany
[22] Filed: Oct. 9, 1975
[21] Appl. No.: 621,002

[30] Foreign Application Priority Data
Oct. 24, 1974 Germany............................ 2450494

[52] U.S. Cl. ................................................. 73/125
[51] Int. Cl.² ............................................. G01L 5/28
[58] Field of Search ............................. 73/125, 121

[56] References Cited
UNITED STATES PATENTS

| | | | |
|---|---|---|---|
| 1,801,927 | 4/1931 | Langbein .............................. | 73/125 |
| 2,022,340 | 11/1935 | Deane.................................. | 73/125 |
| 2,327,617 | 8/1943 | Bennett................................ | 73/125 |
| 3,577,777 | 5/1971 | Whelan et al........................ | 73/125 |

Primary Examiner—James J. Gill
Assistant Examiner—Anthony V. Ciarlante
Attorney, Agent, or Firm—William R. Woodward

[57] ABSTRACT

The engine of a motor vehicle is used to accelerate a flywheel up to a suitable test speed through rollers engaged with driven wheels of the vehicle. Then, when the wheels are braked, one torsion coupling gives a signal corresponding to the total braking force on both wheels and another torsion coupling between two of the rollers gives a signal corresponding to the braking force on one wheel. The braking force on the other wheel is obtained through a subtraction circuit. For testing undriven wheels, the flywheel is first brought up to speed by means of a set of driven wheels, then a clutch is released to free the flywheel while the rollers are stopped and the undriven wheel brought into position, after which the clutch is re-engaged and the undriven wheels are tested. A slip rate circuit is provided to compare the speed of the rollers applying the energy of the flywheel to the wheels under test with the respective speeds of idler rollers engaged with the individual wheels to provide an indication when the brakes are applied too suddenly or to check the safe operation of an anti-lock brake control system if the vehicle is equipped with such a system.

9 Claims, 1 Drawing Figure

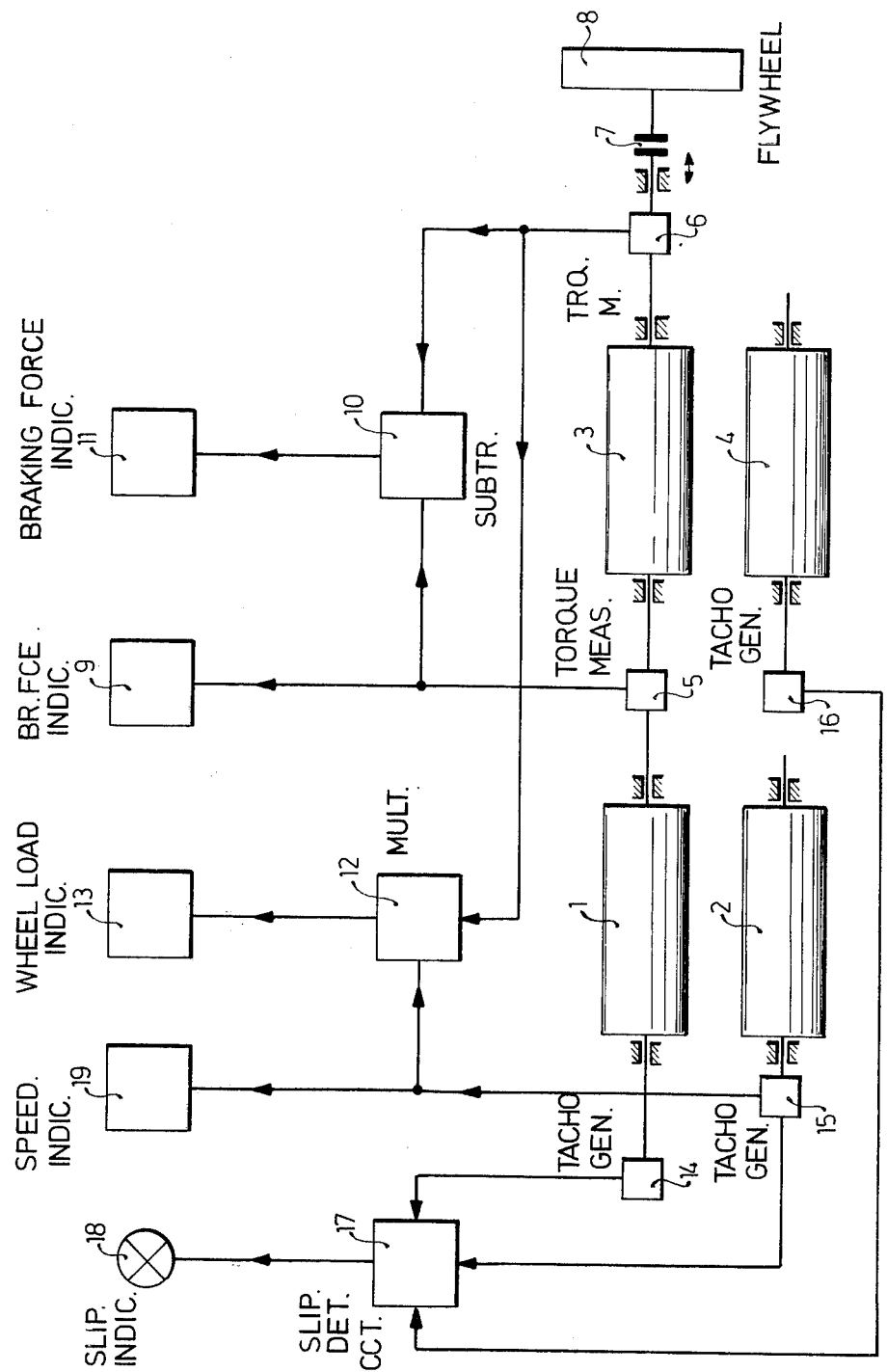

MOTOR VEHICLE BRAKE TEST APPARATUS AND METHOD

This invention relates to a brake test apparatus and a corresponding method, for testing motor vehicle brakes, and in particular to test apparatus and methods in which each pair of wheels of the vehicle is successively brought into contact with a set of rollers with which the wheels can interchange motion while the vehicle is at rest, the rollers being connected to a rotary mass like a flywheel.

In known methods for power measurement, a rotary mass simulating the moment of inertia of the motor vehicle has been coupled with the rollers of a test stand and has been accelerated, while the torque applied to the vehicle wheels or to the test stand rollers has been measured, thus giving a measure of the power of the vehicle engine less the losses involved in transmission of power to the wheels.

For testing brakes, it is conventional to drive the rollers of the test stand that engage the vehicle wheels with electric motors and then to apply the brakes to the vehicle wheels and measure the increase on the loading of the drive motors to obtain a measure for the braking force of the vehicle brakes.

The method just described for measurement of the braking force applied to motor vehicle wheels is unduly expensive, because costly drive motors are provided for operating the test rollers and these drive motors require maintenance attention and must have a high electrical rating and accordingly require high current rating supply circuits, so that the required electrical installation for the drive motors is often impractical or uneconomic for smaller repair shops for motor vehicles.

It is an object of the present invention to provide apparatus and methods for testing the braking load and braking force on the wheels of a motor vehicle and particularly apparatus and methods that can be universally applied without requiring expensive electrical drive motors and without requiring a heavy duty electric power line connection.

SUMMARY OF THE INVENTION

Briefly, a pair of vehicle wheels on a driven axle of the motor vehicle are first brought onto the rollers of a test stand and, with the flywheel or equivalent rotary mass coupled to the rollers, the driven wheels are accelerated and energy is stored in the flywheel. The brakes are then applied and the braking torque is evaluated to indicate the braking force. For testing undriven wheels, the flywheel is first accelerated up to a suitable speed using the driven wheels of the motor vehicle in the same manner as before mentioned, after which the coupling of the flywheel and the test rollers is released by the operation of a clutch mechanism and the rollers are braked to a stop with the vehicle brakes. The vehicle is then moved to bring the undriven wheels onto the rollers, after which the clutch is engaged to re-couple the flywheel to the rollers, driving the vehicle wheels on the rollers with the stored dynamic energy and as soon as the wheels come up to speed, they are braked and the braking torque is evaluated to indicate the braking force. The apparatus of the invention, moreover, is equipped not only to measure the braking force on each wheel in accordance with the procedure above described, but also to check the operation of an anti-lock brake control system in case the motor vehicle is equipped with such a system, and to make all these tests with equipment of low cost. The checking of an anti-lock braking system is done by providing a tachogenerator on the pair of rollers through which the stored energy of the flywheel is applied to the wheels under test and also providing additional tachogenerators respectively to an idler roller in contact with each of the wheels under test and providing a slip rate detection circuit to which the outputs of these tachogenerators are supplied for providing an indication whenever the slip rate resulting from the application of the brakes exceeds a predetermined slip rate. The measurement of the braking force previously referred to is carried out by providing a torsion element interposed between the flywheel and the rollers through which the energy stored in the flywheel is transferred to the wheels under test, this torsion element providing an output corresponding to the total braking force applied to both of the wheels under test, also providing a torsion element between the rollers respectively applying the stored energy to the two wheels under test, the torque indicated by this sound torsion element corresponding to the braking force applied to the wheel which is more remote from the flywheel, and then providing a subtraction circuit for subtracting the torque indicated by the second torsion element from that indicated by the first-mentioned torsion element, so as to provide a measure for the braking force applied to the wheel that is nearer to the flywheel. Furthermore, the output of the first torsion element and the output of the tachogenerator connected to one of the rollers receiving stored energy from the flywheel are both supplied to a multiplier circuit, the output of which corresponds to the product of simulated vehicle speed and total applied force and therefore is a measure of the power absorbed by the brakes under braking, or transmitted to the flywheel on acceleration.

The invention is described in further detail by way of illustrative example with reference to the annexed drawing, the single figure of which is a block diagram of a motor vehicle brake test apparatus according to the invention.

DESCRIPTION OF THE PREFERRED EMBODIMENT

In the drawing are shown a pair of rollers 1, 2 for engagement with the left wheel and a pair of rollers 3 and 4 for engagement with the right wheel of a motor vehicle. The left and right front wheels and the left and right rear wheels are intended to be tested at different times, each test requiring the use of a driven pair of wheels as already mentioned above and further noted below, so that the test stand must be arranged so that the vehicle can be moved to bring either the front wheels or the rear wheels onto this set of rollers just described. The rollers 1 and 3 of the test stand in the embodiment illustrated in the drawing are somewhat in front of the left and right wheels with reference to the normal direction of travel of the motor vehicle. The roller 3 is connected with a first torsion element 6 serving for measurement of torque or braking force, the other end of this first torsion element 6 being connected to one half of a clutch 7, of which the other half is connected with a flywheel 8. A second torsion element 5, likewise serving for measurement of torque or braking force, is connected between the rollers 1 and 3. The second torsion element 5 operates a first braking force indicator device 9 and supplies one input to a subtraction circuit 10. The subtraction circuit, which may simply be a differential amplifier, although it could also be digital subtraction circuit if the torsion elements are provided with digital output circuits, has a second input connected to the output of the first torsion element 6 and has its difference output connected to a second braking force indicator device 11.

There is also a connection from the output of the first torsion element 6 to a multiplier stage 12 that has its other input connected to a tachogenerator 15 which supplies a signal corresponding to the rate of revolution or the circumferential velocity of the roller 2, an idler roller that follows wheel speed and is not subjected to braking slip, so that the output signal of the multiplier stage 12 will correspond to power applied to the vehicle wheels.

A tachogenerator 14 is connected to the axle of the roller 1 in order to provide a signal corresponding to the rate of revolution or circumferential velocity of the rollers 1 and 3, and a tachogenerator 16 is similarly connected to the roller 4. The outputs of the three tachogenerators 14, 15 and 16 are connected to the inputs of a slip rate detector 17 that is responsive to rate of rotation differences between the common rate of rotation of rollers 1 and 3 and the respective individual rates of rotation of the rollers 2 and 4. When the difference in either case exceeds a predetermined value (that is, when the slip rate resulting from braking exceeds a predetermined slip rate), the slip rate circuit 17 produces a critical slip indication in the slip indicator 18. The output of the tachogenerator 15 on the axis of the roller 2 is also supplied to a speed indicator 19 for indicating the simulated vehicle speed.

The power measurement is carried out as follows. The wheels on the engine-driven axle of the motor vehicle are driven onto the rollers 1, 2, 3 and 4, with the left wheel being received by the rollers 1 and 2 and the right wheel by the rollers 3 and 4. The clutch 7 is engaged, so that the flywheel 8 is coupled to the rollers 1 and 3. The engine of the vehicle and with it the driven wheels are then accelerated, setting into motion and accelerating also the flywheel 8 through the rollers 1 and 3. The circumferential force effective on the rollers 1 and 3 during acceleration is transmitted by the first torsion element 6 as a corresponding electrical signal, which is supplied to the multiplier stage 12. In this multiplier stage 12, the circumferential force signal is multiplied by a signal corresponding to the circumferential velocity of the wheels, to produce an electrical signal corresponding to the power applied to the wheels by the vehicle engine and this signal can be displayed by means of the power indicator 13. At the same time the circumferential velocity of the wheels is indicated by the speed indicator 19.

The power measurement above described is preferably carried out in normal high gear, i.e., in a direct drive transmission condition.

The testing of brakes is carried out as follows. After the power measurement above described, the energy stored in the flywheel 8 is absorbed by braking the rollers 1 and 3 by means of the wheel brakes of the vehicle. During the deceleration interval produced by this operation, the first torsion element 6 produces a signal proportional to the total braking force applied to both vehicle wheels and the second torsion element 5 produces a signal corresponding to the braking force applied to the left wheel. These two signals are supplied to the subtraction circuit 10 which generates the difference between the respective output signals of the first torsion element 6 and the second torsion element 5, so that the braking force on the left wheel is subtracted from the total braking force so that the braking force applied to the right wheel can be observed. The braking force on the left wheel is directly shown with the first braking force indicator 9 and that on the right wheel is shown on the second braking force indicator 11 that is connected to the output of the subtraction circuit 10.

If the braking forces of the brakes on undriven wheels of the vehicle are to be indicated, the flywheel is again accelerated by the wheels on a driven axis of the vehicle. As soon as a prescribed speed, predetermined as desirable for the test, is reached, the clutch 7 is released, so tht the flywheel 8 rotates freely. The rollers 1, 2, 3 and 4 are then braked to a stop by the wheel brakes of the vehicle, the driven wheels are then removed from engagement with the rollers, and the undriven wheels to be tested are brought onto the rollers. Then the clutch 7 is again engaged and the flywheel 8 sets these undriven wheels into motion, acting through the rollers 1 and 3. As soon as these wheels come up to speed, thus when the rate of rotation of the flywheel is equal to that of the rollers 1 and 3, the flywheel 8 is braked through the rollers 1 and 3 by applying the brakes to the vehicle wheels. Then as already described, the braking force on the left wheel is directly indicated and the braking force on the right wheel is indicated by generation of the difference between the total braking force and the braking force on the left wheel. The total values are respectively shown on the first braking force indicator 9 and the second braking force indicator 11.

If the brake pedal of the vehicle is too heavily actuated during a brake test, it can occur that at least one of the wheels has too great a slip against a roller, that is, that the difference between the common rate of revolution of the rollers 1 and 3, on the one hand, and one of the individual rates of revolution of the rollers 2 and 4, on the other, exceeds a value that represents a safety limit. In this case the slip circuit 17 responds and operates a slip indicator device 18 that shows that the brake pedal has been too heavily depressed.

The slip circuit 17 and the slip indicator device 18 can be used in connection with the tachogenerators 14, 15 and 16 to provide a simple checking of the operation of an antilock brake control system when such a system is provided for the wheels of the particular vehicle. When an anti-lock control system designed to prevent the locking of the brakes and wheels is properly operating, even a sudden and heavy actuation of the brake pedal would not cause the slip circuit 17 to respond and no slip indication should show up on the critical slip indicator 18.

It is particularly noteworthy in the test and measurement method above described and in connection with the test stand above described that the energy required for brake testing does not have to be supplied by drive motors of high electrical current rating. Furthermore, there is an advantage in that for brake testing, a separation of the rollers 1 and 3 is not necessary, since the individual braking force for the right wheel is obtained by generation of the difference between the total braking force and the braking force applied to the left wheel. A brake test simulating street conditions is possible with the test stand above described and a high initial velocity and thus also a high thermal loading of the vehicle brakes can be obtained without expensive drive motors. Furthermore, if the vehicle should be equipped with an anti-lock brake control system, that system can be tested in a simple manner in the test apparatus of the present invention.

Although the invention has been described with reference to a particular illustrative embodiment, modifications and variations are possible within the inventive concept. For example, at the expense of some duplication of equipment, the movement of the vehicle to test the driven wheels and the undriven wheels can be avoided by providing two sets of four rollers and transmission shafts and clutches for coupling the rotary energy storage device such as the flywheel, with a pair of rollers of either set of four rollers.

I claim:

1. A brake system test apparatus for motor vehicle brakes comprising:

first and second rollers located in spaced parallel relation for supporting engagement with a wheel on a first side of a motor vehicle to be tested in said apparatus, third and fourth rollers respectively coaxial with said first and second rollers and located in spaced parallel relation for supporting engagement with a wheel on a second side of said vehicle;

inertial rotary dynamic energy storage means for a magnitude suitable for simulating the dynamic energy of rolling vehicle moving at a speed substantially corresponding to the rotary speed of one of said wheels;

clutch means for coupling and decoupling said rotary energy storage means respectively with and from said third roller;

first rotary force measuring means interposed in a driving connection between said third roller and said rotary energy storage means;

second rotary force measuring means interposed in a driving connection between said first and third rollers, and means responsive to said first and second force measuring means for separately indicating the braking force applied to each of said wheels, whereby the braking system of a motor vehicle can be tested with the use of the vehicle's own engine as the principal source of dynamic energy by a transfer of energy from said engine to the energy storage means and from the energy storage means to the vehicle wheels.

2. A brake system test apparatus as defined in claim 1 in which said first force measuring means is a torque measuring means responsive to the torque applied by said rotary energy storage means to both of said wheels against braking thereof, for measuring the combined braking force on both wheels, in which, further, said second measuring means is a torque measuring means for measuring the braking force applied to said first wheel, and in which, further, said means responsive to said first and second force measuring means for separately indicating the braking force applied to each of said wheels includes subtraction means for subtracting the output of said second measuring means from the output of said first measuring means and for thereby obtaining an indication of the braking force applied to said second wheel.

3. A brake system test apparatus as defined in claim 1 which further comprises rotary speed measuring means responsive to and coupled to at least one of said rollers and comprising also means responsive to said first force measuring means and said speed measuring means for indicating the combined power applied to said wheels.

4. A brake system test apparatus as defined in claim 3 in which there are provided speed indicating means responsive to said rotary speed measuring means.

5. A brake system test apparatus as defined in claim 3 in which said means responsive to said first force measuring means and to said speed measuring means for indicating the power applied to said wheels includes multiplying means for producing a signal responsive to the product of total force as measured by said first force measuring means and speed as measured by said speed measuring means.

6. A brake system test apparatus as defined in claim 3 in which said first, second and fourth rollers are each provided with rotary speed measuring means and in which, further, the respective outputs of said speed measuring means are provided to slip detector means for detecting and indicating when the rate of slip produced by braking said wheels exceeds a predetermined slip value.

7. A method of testing motor vehicle brakes comprising the steps of:

coupling an inertial rotary dynamic energy storage device to rollers arranged to engage a substantially coaxial pair of motor vehicle wheels;

engaging a driven coaxial pair of motor vehicle wheels with said rollers and driving said pair of wheels to store at least a predetermined amount of dynamic energy in said energy storage device;

braking said pair of wheels against the force provided by energy delivered from said energy storage device while measuring the braking force applied to each of said wheels;

again driving said driven pair of wheels to store at least said predetermined amount of energy in said energy storage device;

uncoupling said energy storage device from said rollers and then bringing said rollers substantially to a stop;

removing said driven pair of wheels from engagement with said rollers and bringing an undriven pair of wheels into engagement with said rollers;

recoupling said energy storage device with said rollers, and braking said undriven pair of wheels while measuring the braking force applied to each of the wheels of said undriven pair.

8. A method as defined in claim 7 in which, at the same time that the braking force applied to each wheel of a pair of wheels is measured, the total load on the pair of wheels applied by said energy storage device is measured and the slip rate produced by braking is compared with a predetermined value of slip rate.

9. A method as defined in claim 7, in which each of the steps of measuring the braking force applied to each of a pair of wheels is performed by making a measurement of the torque applied by the energy storage device to both wheels, measuring the torque applied to the wheel which is the more remote from the energy storage device and subtracting the last-mentioned torque from the first-mentioned torque to determine the torque applied to the wheel nearer the energy storage means.

* * * * *